United States Patent [19]

Oestreich et al.

[11] 4,342,500
[45] Aug. 3, 1982

[54] HIGH VOLTAGE STABILE OPTICAL CABLE STRUCTURES

[75] Inventors: Ulrich Oestreich, Munich; Guenter Zeidler, Unterpfaffenhofen, both of Fed. Rep. of Germany

[73] Assignee: Siemens Aktiengesellschaft, Berlin & Munich, Fed. Rep. of Germany

[21] Appl. No.: 65,602

[22] Filed: Aug. 10, 1979

[51] Int. Cl.³ .............................................. G02B 5/16
[52] U.S. Cl. ................................................ 350/96.23
[58] Field of Search ................... 350/96.23; 174/70 R, 174/116, 113 R

[56] References Cited

U.S. PATENT DOCUMENTS

| 3,800,066 | 3/1974 | Whitfill et al. | 174/116 |
| 3,843,568 | 10/1974 | Woodland et al. | 174/116 |
| 4,037,923 | 7/1977 | Beal. | |
| 4,072,398 | 2/1978 | Larsen et al. | |

FOREIGN PATENT DOCUMENTS

| 1138923 | 6/1963 | Fed. Rep. of Germany. | |
| 7328623 | 8/1973 | Fed. Rep. of Germany. | |
| 2314538 | 10/1974 | Fed. Rep. of Germany. | |
| 2513724 | 10/1976 | Fed. Rep. of Germany. | |
| 2551210 | 5/1977 | Fed. Rep. of Germany. | |
| 2604766 | 8/1977 | Fed. Rep. of Germany. | |
| 52-18338 | 2/1977 | Japan | 350/96.23 |
| 1445732 | 8/1976 | United Kingdom. | |
| 1479427 | 7/1977 | United Kingdom. | |

Primary Examiner—John K. Corbin
Assistant Examiner—Rodney Bovernick
Attorney, Agent, or Firm—Hill, Van Santen, Steadman, Chiara & Simpson

[57] ABSTRACT

An optical cable structure for use in high-voltage environments comprised of a metal-free cable core having optical elements therein and a multi-layer sheath encasing the cable core with all the hollow spaces within the cable core and in the sheath being filled with a softened or plasticized cross-linked synthetic material selected from the group consisting of a polyurethane resin, an epoxy resin and a polyester resin and at least the outer layer of the multi-layer sheath is composed of a creep-resistant material based on a compound selected from the group consisting of a polyolefin, such as a polyethylene or polypropylene, a polyurethane, a polyester or a polyester-elastomer. Such an optical communication cable structure is stabile in high-voltage environments and can be laid as desired adjacent structures carrying high voltage and can, for example, be suspended at overhead voltage lines.

8 Claims, 1 Drawing Figure

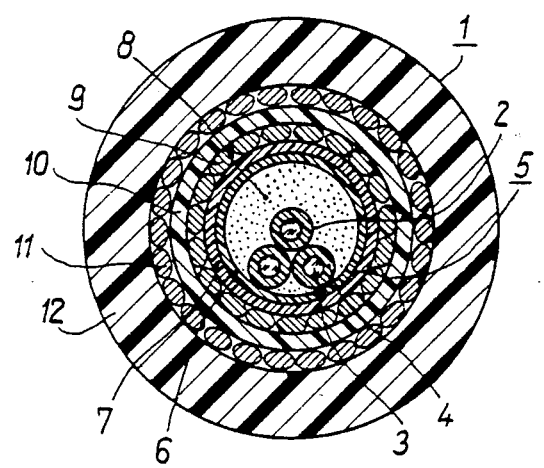

HIGH VOLTAGE STABILE OPTICAL CABLE STRUCTURES

BACKGROUND OF THE INVENTION

1. Field of the Invention

The invention relates to optical communication cables and somewhat more particularly to optical communication cable structures useful in high-voltage environments.

2. Prior Art

Because communication transmission via light signals over optical cables cannot be influenced by electric and or electromagnetic fields, such cables are extremely useful in high-voltage environments wherein systems or devices carry high voltage. Thus, it is known to utilize optical fiber light guides encased in a synthetic material in an area of a high-voltage overhead electrical line and/or to utilize a single or multi-lead glass fiber cable positioned within a center area of an overhead electrical conductor or in an outside covering of a phase-cable, for transmitting optical communication signals (for example see German OS 23 14 538; German OS 26 04 766 or German Utility Model 73 28 623). With such arrangements, the necessary spatial allocations for the optical and electrical compounds are provided during the manufacture of such overhead conductors. It is not possible to later install an optical cable on an already existing overhead line.

Optical communication cable structures are known which have hollow spaces within the cable core filled with a petrolatum-like mass to improve the friction relationship between the core element and to provide longitudinal moisture-impermeability to the resultant structure (for example see German OS 23 02 662 or German OS 24 29 670, which generally corresponds to British Patent Specification No. 1,445,732). Other known optical cable structures are comprised of only synthetic elements so that a metal-free cable structure is attained. In such cable structures, optical transmission elements in the form of glass fibers are surrounded with a loosely applied protective cover (for example see German OS 25 13 724 or German OS 25 51 210).

SUMMARY OF THE INVENTION

The invention provides a completely electrically insulated optical communication cable structure which can be subsequently laid in any manner desired adjacent or within high-voltage devices or environments.

In accordance with the principles of the invention, an optical cable structure is comprised of a metal-free cable core having optical transmission elements and, optionally, tension-releaving or tensile-enhancing element, and a multi-layer sheath encasing such cable core. All hollow spaces with the cable core and the multi-layer cable sheath are filled with a softened or plasticized cross-linked synthetic material selected from the group consisting of a polyurethane resin, an epoxy resin and a polyester resin and at least the outer layer of such multi-layer sheath is composed of a creep-resistant material based on a compound selected from the group consisting of a polyolefin, such as polyethylene or polypropylene, a polyurethane, a polyester or a polyester-elastomer. The plasticizers utilized must have high electrical values and, for example, may comprise softened or plasticized polyvinyl chloride. A suitable plasticizer comprises a dibenzyl toluol. In certain preferred embodiments, the cross-linked synthetic material filling the spaces within the cable core and the multi-layer sheath may include an adhesive component, preferably a polyisobutylene.

BRIEF DESCRIPTION OF THE DRAWINGS

The FIGURE is an elevated, cross-sectional, somewhat schematic view of an exemplary optical cable structure constructed in accordance with the principles of the invention.

DESCRIPTION OF THE PREFERRED EMBODIMENTS

The invention provides a high-voltage stabile optical cable structure which can be positioned or laid in any desired manner in or adjacent high-voltage environments.

In accordance with the principles of the invention, an optical communication cable structure is formed from a metal-free cable core containing at least optical transmission elements therein and a multi-layer sheath encasing such cable core, with all hollow spaces within the cable core and such cable sheath being filled with a softened cross-linked synthetic material selected from the group consisting of a polyurethane resin, an epoxy resin and a polyester resin and at least the outer layer of such multi-layer sheath being composed of a creep-resistance material based on a compound selected from the group consisting of a polyolefin, a polyurethane, a polyester or a polyester-elastomer.

An optical cable structure of the above type constructed in accordance with the principles of the invention is high-voltage stabile over its entire cross section and over its entire length so that it can be positioned on or in high-voltage devices and systems without consideration of different potentials. For example, such cable structure can be suspended at a phase-cable and/or at the guard wire along an overhead voltage line in any desired manner. In such insulations, short anchoring spaces are preferably selected whereby a certain relative sag is to be anticipated in order to allow for heat expansion of the overhead conductors. In consideration of preliminary electrical discharges, elements utilized for fastening optical communication cable structures of the invention to, for example, an overhead conductor, must be composed of highly insulating, creep-resistant synthetic material and must be easily and securely mountable. In view of the rather limited mechanical load capability of such anchoring element and in view of the wind and ice loads typically encountered, an anchoring interval of a few meters is preferable.

In instances where individual overhead conductors comprise bundle conductors, the suspension of an optical communication cable structure of the invention with such conductors preferably occurs by placing such optical cable structures within the inner area of the bundle structure in order to avoid amplification of corona discharge through the insulating cable in a wet state. Changes from one overhead conductor to another are possible at any time in the area of the anchoring insulators of an overhead line if distance fluctuations, such as can arise due to oscillations or movements in the sagging portion of such line, are taken into consideration.

In constructing high-voltage stabile optical communication cable structures, it is essential that in instances where optical leads having a synthetic sheath loosely surrounding the individual glass fibers (hollow leads), the space within the sheath be completely filled with an aging-resistant and high-voltage resistant migration-free material. This material should not immobilize the individual glass fiber and it may be of an oily nature. The hollow spaces within a cable core between the leads and tension-releaving elements which may be optionally present, are preferably filled with a uniform mass of material, which, however, can be harder than the material employed within a lead sheath. In so far as web coverings and/or braiding and/or yarn spinnings are utilized to form a cable sheath, any hollow spaces within such covering must also be completely filled with a high-voltage stabile mass. Thread-like sheathing elements, when employed, are preferably impregnated with the high-voltage stabile mass utilized.

Preferred voltage-stabile masses comprise softened cross-linked synthetic materials selected from the group consisting of polyurethane resin, epoxy resin and polyester resin. Such materials are considerably well suited for filling the hollow spaces within a cable core and within a cable sheath. Softeners or plasticizers having high electrical values are known, for example, for plastification of polyvinyl chloride. A suitable softener, for example, is a dibenzyl toluol, for example available under the trade name "Lipinol T" (see German Patent 11 38 923). The complete filling of hollow spaces within a cable core and cable sheath with a high-voltage stabile material can be further improved by including an adhesive component, particularly a polyisobutylene.

In high-voltage technology it is known that surfaces exposed to high-voltages must have sufficient creep-resistance and this principle is applicable at least to the exterior surfaces of the optical cable structure of the invention. Accordingly, at least the outer layer of the multi-layer sheath utilized with the cable structure of the invention is composed of a creep-resistant material, which is known per se, based on a compound selected from the group consisting of a polyolefin, such as polyethylene or polypropylene, a polyurethane, a polyester or a polyester-elastomer.

Referring now to the drawing wherein an exemplary embodiment of an optical communication cable structure constructed in accordance with the principles of the invention is illustrated as comprising an optical cable structure 1 having non-stranded optical leads 2 arranged in the center thereof. Each optical lead is comprised of a glass fiber 3 and a hard, elastic envelope 4, for example composed of polyethylene terephthalate. In the exemplary structure shown, three leads are positioned within a double-layered sheath 5, which consists of an inner layer 6, for example composed of an ethylenechlorotrifluorethylene-copolymer and an outer layer 7, for example composed of polyethylene terephthalate. The hollow space within the double-layered sheath 5 is completely filled with a high-voltage stabile oily mass 8, which is based on polyurethane.

A multi-layer sheath is utilized as a cable casing and consists of an inner web covering 9 of high-strength synthetic threads, an inner sheath 10 composed of, for example, a thermoplastic polyurethane, an outer web covering 11 of high-strength synthetic threads and an exterior sheath 12 composed of, for example, polyurethane. The high-strength synthetic threads of the web coverings 9 and 11 are composed of, for example, an aramide yarn which is saturated with a high-voltage stabile mass, which may be identical to mass 8 earlier discussed. All hollow spaces between the double-layer sheath 5 and the inner sheath 10 as well as between the inner sheath 10 and the exterior sheath 12 are completely filled with a high-voltage stabile mass, which is, for example, based on polyurethane.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. An optical cable structure for use in high-voltage environments, comprising:
   a metal-free cable core containing optical transmission elements;
   a multi-layer sheath encasing said cable core and having an exterior layer;
   a plasticized cross-linked synthetic material selected from the group consisting of a polyurethane resin, an epoxy resin and a polyester resin in all hollow spaces within said cable core and within said sheath; and
   at least said exterior layer of said multi-layer sheath being composed of a creep-resistant material based on a compound selected from the group consisting of a polyolefin and a polyester material.

2. An optical cable structure as defined in claim 1 wherein said polyolefin is selected from the group consisting of polyethylene and polypropylene.

3. An optical cable structure as defined in claim 1 wherein said polyester is a polyester-elastomer.

4. An optical cable structure as defined in claim 1 wherein said plasticized cross-linked synthetic material filling the hollow spaces within the cable core and within the sheath is plasticized with a plasticizer for polyvinyl chloride having high electrical values.

5. An optical communication cable structure as defined in claim 4 wherein said softener is a dibenzyl toluol.

6. An optical communication cable structure as defined in claim 1 wherein the plasticize cross-linked synthetic material filling the hollow spaces within the cable core and within the multi-layer sheath contains an adhesive component.

7. An optical communication cable structure as defined in claim 6 wherein said adhesive component is a polyisobutylene.

8. An optical communication cable structure as defined in claim 1 wherein said metal-free cable core contains tension-relieving elements.

* * * * *